July 17, 1956     T. P. FARKAS     2,754,658
SPEED TOPPING CIRCUIT FOR A SPLIT TURBINE
Filed Dec. 6, 1952     2 Sheets-Sheet 2

INVENTOR
THOMAS P. FARKAS
BY Harris G. Luther
ATTORNEY

United States Patent Office 2,754,658
Patented July 17, 1956

2,754,658
SPEED TOPPING CIRCUIT FOR A SPLIT TURBINE

Thomas P. Farkas, Bloomfield, Conn., assignor to United Aircraft Corporation, East Hartford, Conn., a corporation of Delaware Application December 6, 1952, Serial No. 324,570

12 Claims. (Cl. 60—39.16)

This invention relates to fuel control mechanism and particularly to safety means for preventing overspeeding of one-half of a split turbine.

An object of the invention is to provide a safety control signal which will override the normal control signals.

A further object is to provide an overspeed signal upon overspeeding of the normally uncontrolled portion of a split turbine.

A further object is to substitute an overspeed signal for a temperature signal.

A still further object is the provision of means, in a fuel control that normally controls fuel in response to speed of one part of a split turbine and temperature, for controlling fuel in response to speed of the other part of the split turbine upon overspeeding of said other part.

Figure 1:
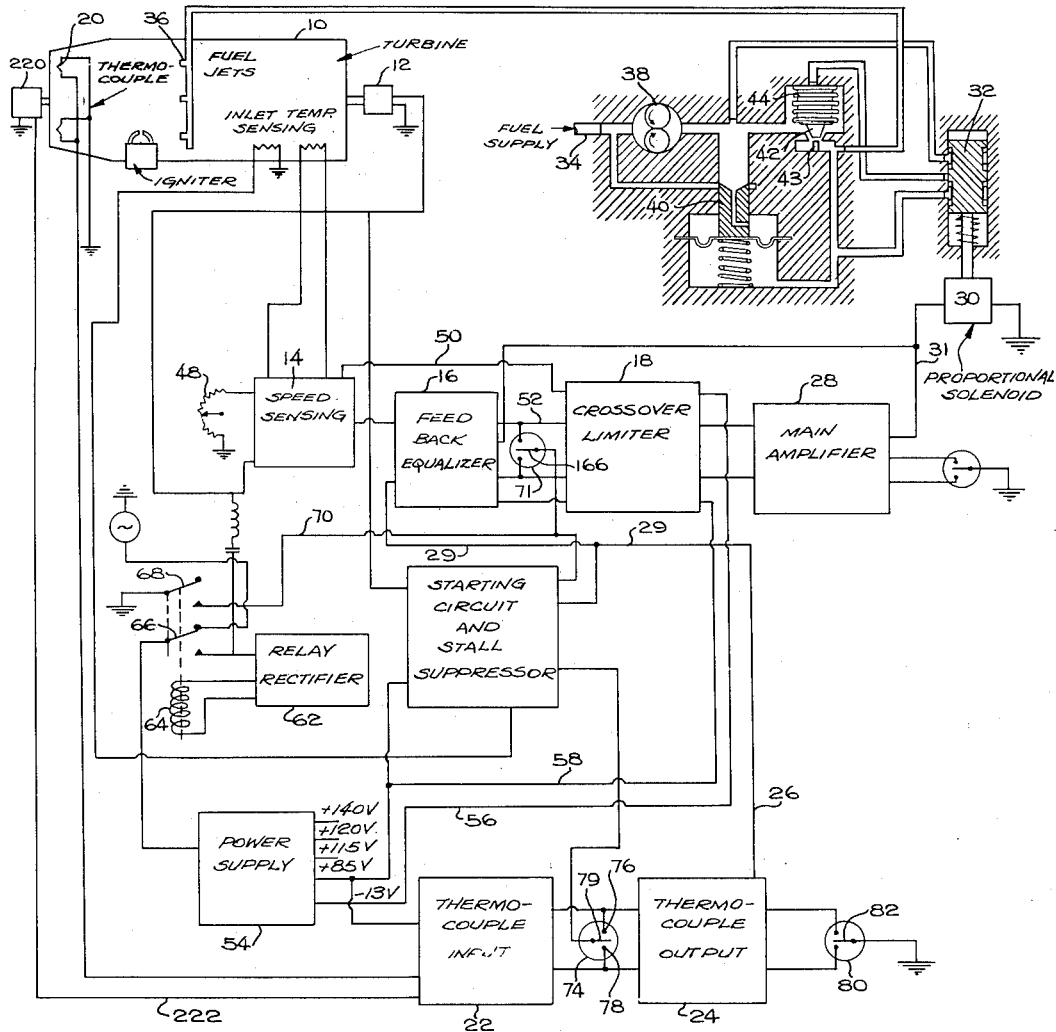

Additional objects and advantages will be apparent from the attached specification, claims and drawings in which, Fig. 1 is a schematic and block diagram showing the general arrangement of the turbine, the fuel supply and the electronic control for the fuel supply.

Figure 2:
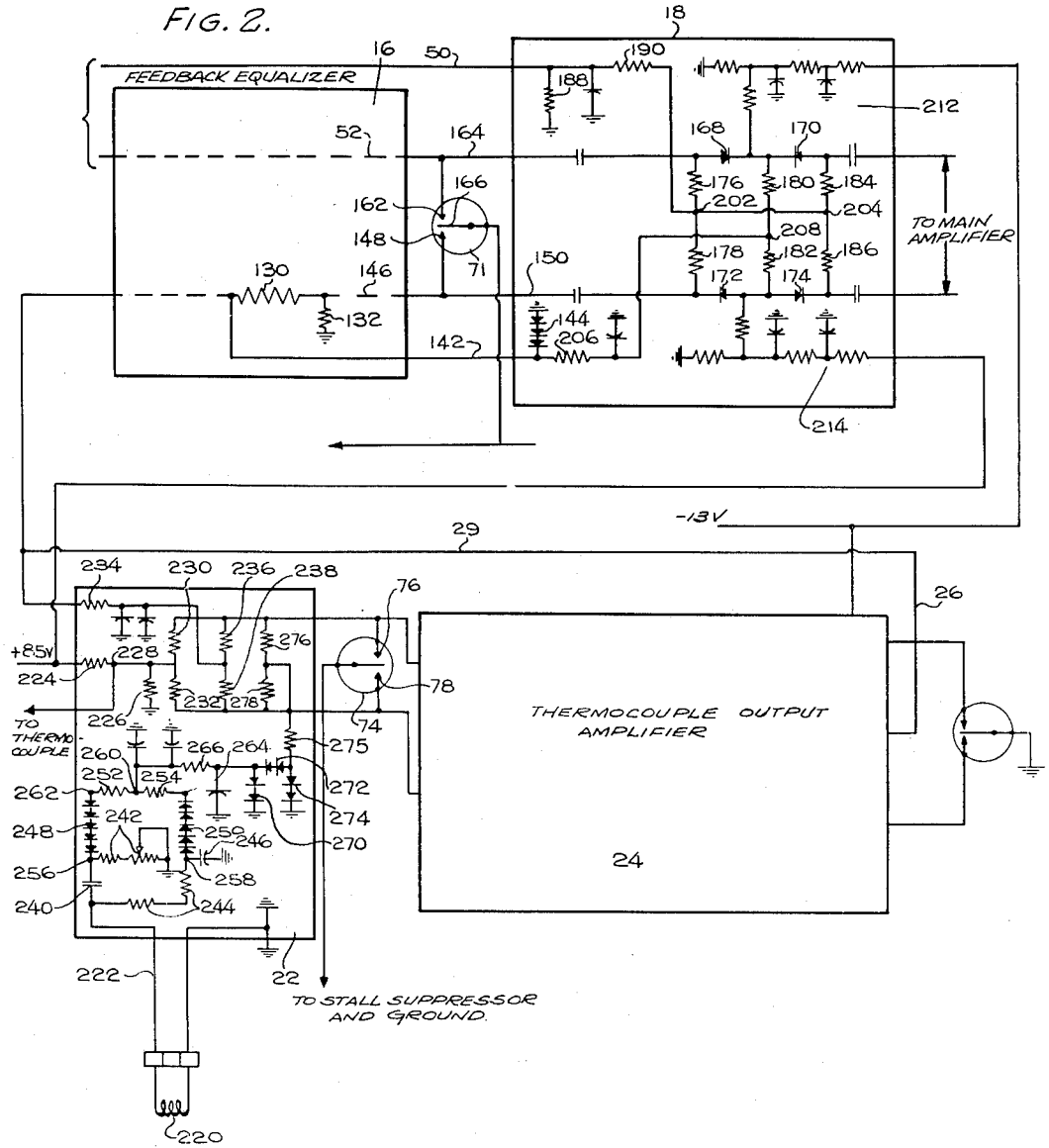

Fig. 2 shows the thermocouple input circuit including the safety topping circuit and the crossover limiter schematically in more detail than Fig. 1 including the wiring diagrams therefor.

Referring to the drawings and particularly to Fig. 1, the turbine jet engine 10 may be of any well known split turbine type such as the type shown in Fig. 15 of Anxionnaz Patent No. Re. 23,198 and utilizing compressors receiving air from an air inlet and delivering the air under pressure to a combustion chamber where fuel is burned. The products of combustion from the combustion chamber are fed to two gas turbines in series which drive separate compressors. Gases exhausted from the turbines pass out through a tailpipe. The split turbine usually comprises an inner spool and an outer spool arranged coaxially with the shaft of the outer spool surrounding the shaft of the inner spool. The inner spool has the low pressure compressor at one end and the low pressure turbine at the other end while the outer spool has the high pressure compressor at one end and the high pressure turbine at the other end.

During operation of a split turbine, the fuel is selectively controlled by a speed or a temperature sensitive control system, utilizing the speed of the high pressure spool and the temperature of the tailpipe for the control. A speed is selected by the pilot on a speed control 48 which will select a datum for the speed sensitive control system. The signal from the speed sensitive control system is compared with a signal from the temperature sensitive control system in the crossover limiter and the resultant signal is used to position the pilot valve controlling the flow of fuel to the turbine. Thus control of the throttle is effected by movement of the speed control lever 48.

This control is electronic in nature and in general is similar to that shown in Offner application Serial No. 84,696, filed March 31, 1949, entitled, System of Engine Speed Control now Patent No. 2,697,908. As shown in Fig. 1, of the present application, a speed signal is taken from a generator 12, which may be an alternating current generator driven by the high pressure turbine, and is fed to a speed sensing circuit 14. In the speed sensing circuit, a speed error voltage is produced. This error voltage may be zero when the turbine is on speed, positive when the turbine is over speed, and negative when the turbine is under speed. The speed error signal is fed to crossover limiter 18.

A temperature signal is fed from tailpipe thermocouples 20 to thermocouple input circuit 22 where it is compared with a fixed voltage and transformed into a temperature error signal. The temperature error signal is amplified in the thermocouple outlet circuit 24 and fed through line 26 to feedback equalizer 16 and crossover limiter 18. The amplified temperature error signal is zero or null when ontemperature, positive when the turbine is overtemperature and negative when the turbine is undertemperature. In the crossover limiter 18, the most positive or least negative signal of the speed and temperature signals is selected to be transmitted to the main amplifier 28 where it is amplified and then fed to the proportional solenoid 30 through the line 31.

The proportional solenoid is of a type shown in Patent No. 2,579,723 issued December 25, 1951 to S. G. Best for Magnetic Device, to which reference may be made for a more detailed explanation. The proportional solenoid 30, which is normally centered or biased slightly in the fuel reducing direction but may be moved in one direction with a negative signal and in the opposite direction with a positive signal, operates a valve 32 controlling the flow of fuel from the fuel supply 34 to the fuel jets 36. This fuel supply system is of the type shown in application Serial No. 231,926 filed June 16, 1951, by D. R. Pearl and S. G. Best, for Fuel Control System for Turbine Engine, to which reference may be made for more detailed explanation and generally includes a fuel pump 38 for supplying fuel under pressure with a pressure actuated relief valve 40 for maintaining the pressure drop the same across the throttle valve 42. Valve 32 directs either the high or low pressure to the interior of bellows 44 to move valve 42 toward closed or opened position to thereby regulate the flow of fuel to the fuel jets 36. The movement of the valve toward closed position may be limited by a stop such as 43 to provide a minimum fuel flow.

The speed sensing circuit 14 utilizes a bridge circuit to match a constant voltage selected by the pilot's lever 48 against the voltage produced by a speed signal generator 12, the resulting signal is rectified to give a speed error signal which is applied to lines 50 and 52.

Power for operating the various electronic elements is normally provided by the generator 12 operating through a usual power supply 54, supplying among other voltages a minus 13 volt bias in line 56 and a plus 85 volt voltage-regulator-tube-controlled voltage in line 58. During the starting cycle, however, 400 cycle A. C. voltage from an outside source is supplied through the line 60 to the power supply. When a preselected speed is reached by the turbine and accordingly by the generator 12, the generator voltage acting through relay rectifier 62 and relay coil 64 will actuate switch arm 66 to disconnect the 400 cycle source and connect in the generator 12 to the power supply. A second switch arm 68 is actuated by the coil 64 at the same time in order to ground out line 70 to connect the swinger of chopper 71 to ground and disable the starting circuit after a preselected speed is reached. Reference may be had to application Serial No. 282,204, filed by Stanley G. Best and Thomas P. Farkas, on April 15, 1952, for Starting Circuit for Electronic Jet Fuel Control for further details of the starting circuit. The thermocouple output amplifier and the main amplifier are, in effect D. C. chopper amplifiers of a well known type.

The thermocouple input and chopper 74 balance the thermocouple signal against a datum which may be fixed or may be varied as desired. The temperature signal may be compensated for thermocouple lag by a feedback circuit which will be described in more detail later.

The correction voltage or temperature error signal supplied by the thermocouple to the chopper contacts 76 and 78 is positive for an undertemperature condition and negative for an overtemperature condition. If a variable datum is used, a signal which is usually positive way be fed to the swinger 79 of chopper 74 to modify the amplitude of the square wave produced by the chopper 74. The swinger arm 82 of chopper 80 is mechanically synchronized with chopper arm 79 in such a way that positive signals at 76 and 78 will produce negative (i. e. undertemperature) voltage in the line 26 while negative voltages in the contacts 76 and 78 will produce positive (i. e. overtemperature) voltages in the line 26.

The convention observed with respect to the illustration of rectifiers herein is that current flow (from plus to minus) as distinct from electron flow is in the direction of the arrow.

The temperature error signal on line 26 is led through line 29 to resistors 130 and 132 to form a voltage divider circuit. A portion of the temperature error signal is led off through line 142 to the crossover limiter for switching purposes, which will be explained later. In the crossover limiter, rectifier 144 connects line 142 with ground and limits any negative temperature error voltage appearing on line 142 to a small amount, approximately one volt. A portion of the temperature error signal is led off from a point between resistors 130 and 132 through line 146 to contact 148 of the chopper 71 and is also led through line 150 into the crossover limiter from which it is selectively fed to the proportional solenoid in a manner to be described later.

The speed error signal is fed through line 52 to the contact 162 of chopper 71. This speed error signal is led on line 164 into the crossover limiter from which it is selectively fed to the proportional solenoid in a manner to be described later. The speed error signal, applied to line 50 from the speed sensing circuit, is fed into the crossover limiter for switching purposes which will be described later.

The speed and temperature error signals fed through lines 164 and 150 into the crossover limiter are led to rectifiers which will select one or the other as the signal to be transmitted to the main amplifier and thence to the proportional solenoid. The speed error signal on line 164 is a square wave and is led to rectifiers 168 and 170. The temperature error signal on line 150 is also a square wave and is led to rectifiers 172 and 174.

The speed error signal fed into the crossover limiter through line 50 is led through resistors 188 and 190, the condensers in the lines serving as filters. The speed error voltage existing after passing through the resistor 190 is applied at 202 between resistors 176 and 178 and at 204 between resistors 184 and 186. This is a rectified D. C. error signal and is used to bias rectifiers 168, 170, 172 and 174. In the same manner the D. C. temperature error signal is led in on line 142 and after passing through resistor 206 is applied at 208 between resistors 180 and 182 which are connected to the rectifiers 168, 170, 172 and 174 to bias them. It will now be apparent that if the voltage in the speed error signal at 202 and 204 is more positive than the voltage in the temperature error signal at 208, rectifiers 168 and 170 will be biased to conduction and rectifiers 172 and 174 will be biased to non-conduction. Rectifiers 168 and 170 being conductive will pass the speed error square wave produced by chopper 71 and fed in line 164 to the crossover limiter.

Conversely, if the temperature error signal fed into point 208 is more positive than the speed error signal fed into points 202 and 204, then rectifiers 172 and 174 will be biased to conduction and rectifiers 168 and 170 will be biased to non-conduction. The temperature error square wave fed in through line 150 will then be able to pass through rectifiers 172 and 174 to the proportional solenoid while the speed error signal becomes blocked. It is thus apparent that the most positive or the least negative error signal of the speed or temperature will select its corresponding square wave as the signal to be transmitted, amplified and fed to the proportional solenoid.

The network shown generally at 212 is fed from the minus 13 volt bias line of the power supply and is used to slightly bias rectifiers 168 and 170 to avoid the deadband common to all rectifiers. In a similar way the network shown generally at 214 is fed from the plus 85 volt section of the power supply to provide a bias for rectifiers 172 and 174 to avoid the deadband.

The speed and temperature error signals are arranged so that when fed to the crossover limiter an overspeed or overtemperature condition is indicated by a positive signal and conversely an undertemperature or underspeed signal is negative. In order to actuate the proportional solenoid 30 to close the throttle valve 42, it will therefore be necessary to feed a positive signal into the crossover limiter. This will call for less fuel in order to overcome an overspeed or overtemperature condition and thus close the valve. On the other hand, in order to actuate the proportional solenoid 30 so as to open the throttle valve 42, it will be necessary to feed two negative signals (i. e. both speed and temperature) into the crossover limiter. If one of the signals, say the temperature signal, is zero, i. e. neither positive nor negative, and the other, speed, is negative, the proportional solenoid will not be actuated and hence the throttle valve will not be changed.

In a split turbine and particularly one with an afterburner connected directly to the exhaust of the low pressure turbine, a sudden flameout in the afterburner will produce a sudden pressure drop back of the low pressure turbine causing it and its associated low pressure compressor to rapidly increase in speed until the pressures through both the high and low pressure turbines are again stabilized. This sudden increase in speed may be great enough to cause damage to either the compressor or the turbine but as the controls are located on the other part of the split turbine which has no mechanical connection to the low pressure part, there will be no acts initiated to quickly close the throttle and prevent this temporary overspeeding. In order to provide a control sensitive to the speed of the low pressure turbine and which will control only during overspeed excursions of the low pressure turbine, I have provided a generator 220 driven by the low pressure turbine. This alternating current generator is connected by line 222 with the thermocouple input circuit so as to bias that circuit on an overspeed by the low pressure turbine and give a positive signal in line 29 on the output of the thermocouple amplifier which will be fed into the crossover limiter 18 to provide a throttle closing action of the proportional solenoid 30.

In the thermocouple input a constant voltage, the 85 volt line, is led through voltage divider 224, 226 to a junction 228 with the thermocouple output and in electrical opposition thereto. The predominating voltage at junction 228 is led through resistors 230 and 232 to contacts 76 and 78 of chopper 74 to provide the square wave for the thermocouple amplifier. Resistances 234, 236 and 238 are part of a feedback circuit which need not be further explained here to understand the present invention. It will be understood that the thermocouple is connected to provide a negative signal which will increase on increase in temperature and thus overcome the positive signal from the 85 volt source to provide a negative input on overtemperature into the thermocouple amplifier which will provide a positive output from the amplifier to the crossover limiter. In a similar manner in an undertemperature condition, the thermocouple will provide a smaller signal which will permit the positive voltage from the 85 volt source to predominate which, after passing through the thermocouple amplifier, will provide a negative or undertemperature signal in the crossover limiter.

A frequency responsive circuit similar to that disclosed in application No. 261,020 of Thomas P. Farkas filed December 11, 1951, is utilized to obtain a speed responsive signal from the generator 220. The alternating current generator 220 driven by the low pressure turbine is connected through a bridge circuit having condenser 240 and adjustable resistances 242 as one pair of legs and resistances 244 and condenser 246 as the other pair of legs. Rectifiers 248 and 250 are connected through resistances 252 and 254 across the junctions of the bridge so as to provide opposite polarities at the rectifier outputs. Resistance 242 is adjusted so that at some selected speed the voltage at junctions 256 and 258 of the bridge will be equal. This will provide voltages of equal and opposite polarity at the output of the rectifiers and zero voltage at the junction 260 of resistors 252 and 254.

An increase of speed of the generator 220 will increase its frequency and its amplitude and reduce the reactance of condenser 240 and condenser 246 which will greatly increase the voltage at 256 and leave the voltage at 258 substantially constant. In consequence the negative voltage at the junction 262 of the rectifier 248 and resistance 252 will increase and the positive voltage at the junction 264 of the rectifier 250 and resistance 254 will remain constant which will give a negative voltage at the junction 260 of the two resistors. This negative voltage is fed through resistor 266 to rectifiers 270, 272, 274 which will permit a negative signal to pass but will block a positive signal. The negative signal produced by overspeed of the generator 220, after passing through the rectifier 272, passes through resistance 275 and then through resistances 276 and 278 to the contacts 76 and 78 of the chopper 74. This negative signal will override any positive signal that may be put out by the thermocouple at junction 228 and will provide a negative signal to the thermocouple amplifier which will become a positive signal in line 29 and is thus fed to the crossover limiter from which it will actuate the proportional solenoid 30 to reduce the fuel flow.

It will be apparent that any underspeed condition of the generator 220 will have no effect on the thermocouple circuit because rectifiers 270, 272 and 274 will effectively ground any positive signal and prevent its passage through to the chopper contacts.

Although the circuit including the speed sensing and speed topping safety circuit has been described in detail and only a single embodiment has been used as an example in the description, it will be apparent that many modifications may be made which will come within the scope of the invention. Therefore, I do not desire to be limited by the details of the embodiment which has been selected for the purpose of explaining the invention. For example, while particular polarities have been chosen and used in the embodiment described, it is apparent that the several polarities may be reversed without affecting the result and while I have used a split turbine having coaxial rotors each driving a separate compressor for purposes of illustration it is apparent that this invention could be used to control a split turbine in which the rotors are in separate housings and one of which may be driving something other than another compressor.

What it is desired to secure by Letters Patent is:

1. In combination in a fuel control system for a two spool turbine in which the turbine actuating fluid is fed through the two turbines in series and the fuel for both turbines is normally controlled by means responsive to the speed of only one turbine, means creating a first signal responsive to the speed of said one turbine, fuel control means and means connecting said signal creating means with said fuel control means for regulating the speed of both turbines by controlling the fuel feed, mechanism connected with the other turbine for creating a second signal responsive to an overspeed condition of said other turbine, means connecting said mechanism with said fuel control including means blocking said first signal and utilizing said second signal for controlling fuel.

2. In combination, in a fuel control for a split turbine having means for creating a first electrical signal responsive to the speed of one of said turbines, fuel control means and means connecting said signal creating means with said fuel control means, mechanism connected with the other turbine for creating a second electrical signal responsive to an overspeed condition of said other turbine, means connecting said mechanism with said fuel control including means for overriding said first signal and utilizing said second signal for controlling fuel, and means for suppressing said second signal except when said other turbine overspeeds.

3. In combination, in a fuel control system for a split turbine, a first means for converting the output of a generator driven by one portion of said turbine into electrical signals responsive to the speed of said one portion, fuel control means and means for directing said electrical signals to said fuel control means for actuating the same, a second means for converting the output of a second generator driven by the other portion of said turbine into an overspeed signal upon overspeeding of said other portion, means for directing said overspeed signal to said fuel control means including means for overriding said first mentioned signals and utilizing said overspeed signal to actuate said fuel control means.

4. A device as in claim 2 in which said second means for converting the output of a second generator includes means for preventing passage of an onspeed or underspeed signal to said fuel control and means for passing an overspeed signal to said fuel control.

5. In a fuel control system for a split turbine engine having temperature sensing means and a first speed sensing means for one portion of said turbine, and a second speed sensing means for the other portion of said turbine, fuel control means, means for converting the output of said sensing means into fuel controlling signals, means connecting the output of the converting means for said temperature sensing means and said first speed sensing means with said fuel control means for selecting the output to be utilized for actuating said fuel control means, means connecting the output of the converting means for said second speed sensing means with the output of the converting means for said temperature sensing means, including means suppressing onspeed and underspeed signals and passing overspeed signals, whereby said overspeed signals will be substituted for said temperature responsive fuel controlling signals, said connecting and selecting means adapted to select the greatest overspeed signal for reducing fuel flow.

6. In combination in a fuel control system for a split turbine in which the fuel is normally controlled by means responsive to selected parameters of the first turbine and the second turbine is free, means for creating a signal responsive to the speed of the first turbine, fuel control means and means connecting said signal creating means with said fuel control means for regulating the speed of both turbines by controlling the fuel fed thereto, mechanism connected with said second turbine for creating a second signal responsive to an overspeed condition of said second turbine, means connecting said mechanism with said fuel control including means for substituting said second signal for said first signal for controlling fuel.

7. In combination, in a fuel control system for a split turbine in which the fuel is normally controlled by means responsive to selected parameters of the first turbine and the second turbine is free, fuel control means, means responsive to the speed of said first turbine connected with said fuel control means, mechanism responsive to the speed of said second turbine, means connecting said mechanism with said fuel control means upon an overspeed condition of said second turbine, said last mentioned connecting means including means comparing the speeds of the two turbines and means selecting the turbine having the greatest overspeed as the turbine to actuate the fuel control and disabling the control function of the other turbine.

8. In a fuel control system for a split turbine engine, means creating a first signal responsive to one parameter of operation of one portion of said turbine, means creating a second signal responsive to another parameter of operation of said one portion, and means creating a third signal responsive to the speed of operation of the other portion of said turbine, means comparing the first and second signals and selecting the algebraically predominant signal and converting it into a fuel controlling signal and blocking the other compared signal, means blocking the third signal except when it indicates overspeed and means combining the unblocked third signal with a selected one of said first and second signals including means substituting the combined signal for said selected one of said first and second signals in said comparing means.

9. A device as claimed in claim 8 in which said one parameter of operation is the speed of said one portion of said turbine.

10. A device as claimed in claim 8 in which the other parameter of operation is the temperature of a selected portion of said one turbine.

11. A device as claimed in claim 8 in which the first signal is responsive to the speed of said one portion of said turbine and the second signal is responsive to the temperature of a selected part of said one portion of said turbine.

12. A combination as claimed in claim 6 in which the signals are electrical signals.

References Cited in the file of this patent

UNITED STATES PATENTS

| | | |
|---|---|---|
| 2,542,499 | Fortescue | Feb. 20, 1951 |
| 2,603,063 | Ray | July 15, 1952 |
| 2,606,420 | Moore | Aug. 12, 1952 |
| 2,627,717 | Waller | Feb. 10, 1952 |
| 2,662,372 | Offner | Dec. 15, 1953 |